US006304017B1

(12) United States Patent
Leupold

(10) Patent No.: US 6,304,017 B1
(45) Date of Patent: Oct. 16, 2001

(54) COUNTER ROTATING NESTED CYLINDERS IN ELECTRICAL MACHINERY

(75) Inventor: Herbert A. Leupold, Eatontown, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/507,296

(22) Filed: Feb. 18, 2000

(51) Int. Cl.[7] .................................................. H02K 21/00
(52) U.S. Cl. ..................... 310/115; 310/114; 310/154.01; 310/156.01; 310/266; 310/152
(58) Field of Search .................................... 310/115, 114, 310/179, 156, 266, 152

(56) References Cited

U.S. PATENT DOCUMENTS

| | | | | |
|---|---|---|---|---|
| 5,783,893 | * | 7/1998 | Dade et al. ........................... | 310/266 |
| 6,049,152 | * | 4/2000 | Nakano ................................ | 310/114 |
| 6,054,789 | * | 4/2000 | Leupold ............................... | 310/156 |

OTHER PUBLICATIONS

Leupold, H.A., "Rare–Earth Permanent Magnets", edited by J.M.D. Coey, Oxford Science Publications, Oxford University Press, Inc., New York, pp. 402–405, 1996.

Leupold, H.A. et al, "Applications of yokeless flux confinement", Journal of Applied Physics, 64, pp. 5994–5996, 1988.

* cited by examiner

Primary Examiner—Burton S. Mullins
(74) Attorney, Agent, or Firm—Michael Zelenka; George B. Tereschuk

(57) ABSTRACT

The nested magic cylinders are rotatable and coaxially arranged so that the bore of the inner cylinder provides a central working space. The predetermined magnetic orientation of each cylinder's sections is arranged to create a relatively strong and uniform magnetic field within the central working space or bore in which copper wires are imbedded to form a core. A core having copper wires embedded within the working space is coaxially positioned within the bore to act as a rotor and when current flows within the copper wires an electric motor is therefore formed. Alternatively, a rotating device can mechanically rotate the rotor or core, inducing a current in the copper wires in the rotor or core thereby forming an electric generator. The sections of the nested permanent magnet cylinders are arranged such that each of the sections have a magnetic orientation forming a pair of coaxial "magic" cylinders or rings that counter rotate with respect to each other. This results in a relatively large magnetic field within the inner cylinder's central working space with minimal magnetic flux leakage exterior to the central working space. In a preferred embodiment the pair of magnetic cylinders counter rotate and the core remains stationary, which simplifies the required electrical connections with the core.

13 Claims, 5 Drawing Sheets

COUNTER ROTATING NESTED CYLINDERS IN ELECTRICAL MACHINERY

GOVERNMENT INTEREST

The invention described herein may be manufactured, used, imported, sold, and licensed by or for the Government of the United States of America without the payment to me of any royalty thereon.

FIELD OF THE INVENTION

This invention relates in general to electric motors or generators, and more specifically to an electric motor or generator utilizing a cylindrical permanent magnet field source.

BACKGROUND OF THE INVENTION

In electrical generators the aim is always to maximize the magnetic flux threading the coils in which the generated current flows because the electromotive force generated is directly proportional to that flux. Three factors determine total flux: (1) flux density, (2) threaded coil area, and (3) number of coils. An extremely useful magnetic generator is described in the inventor's U.S. patent application Ser. No. 09/034,073, entitled "Cylindrical Permanent Magnet Magic Ping Electric Motor and Generator," which is incorporated herein by reference. That application describes a generator in which a rotating magic cylinder provides a high magnetic field that threads a compact coil in its central cavity causing a large flux through the coil. In that device, the cylinder's rotation causes the flux to alternate because, the angle of the field with respect to the plane of the coil changes linearly with time, and the area of the coil normal to the field varies periodically based on the formula:

$$A_n = A \sin \omega t \tag{1}$$

where A is coil area and $A_n$ is the area of the coil normal to the field. Based on this relationship, the total flux can vary sinusoidally because magnetic flux:

$$\Phi = HA_k = HA \sin \omega t = \Phi_A \sin \omega t \tag{2}$$

where $\Phi_A$ is flux amplitude. Since the induced electromotive force is proportional to the flux, the electromotive force is also sinusoidal, resulting in an Alternating Current. The field magnitude in that device's coil material is constant (H) and induces lossy eddy currents that are proportional to the square of the field magnitude.

The present invention provides a pair of coaxial nested magnetic cylinders rotated with respect to each other so that each cylinder contributes the same amount of magnetic field to the total, i.e. each contributes H/2. In order to accomplish this, it is necessary for the radius, $r_b$, of the border between the inner and outer cylinders, be calculated according to the following formula:

$$r_b = \sqrt{r_i r_o} \tag{3}$$

where $r_i$ is the radius of the core cavity and $r_o$ is the outer radius of the system. The devices of the present invention generate currents equivalent to the single rotating magnetic cylinder, without the disadvantages, shortcomings and limitations of eddy current losses experienced by single rotating magnetic cylinders.

SUMMARY OF THE INVENTION

The present invention is directed to an electric motor or generator utilizing a counter rotating nested cylindrical permanent magnet composed of a pair of nested magic cylinders, each having a plurality of sections, with each section having a predetermined magnetic orientation or magnetization direction. In this device, each of the two nested magic cylinders contributes the same amount of magnetic field to the total; i.e. each nested magic cylinder contributes H/2, where H is the total field produced.

In accordance with the present invention, when these cylinders are aligned they combine their fields to equal H, the same as that for the undivided single magic ring cylinder described above. When the nested cylinders rotate in opposite directions at the same angular speed, the magnetic field, instead of the threaded normal area, will vary sinusoidally, according to the formula:

$$\Phi = A(H \sin \omega t) \tag{4}$$

instead of the varying magnetic field of the single rotating magic cylinder, according to the formula:

$$\Phi = H(A \sin \omega t) \tag{5}$$

The results of these equations are, of course, the same. However, the generation of Eddy currents due to relative motion of field and coil material depends on the magnitude of the magnetic field, which is constant in formula (4) at maximum value, but the magnitude of the magnetic field varies sinusoidally in formula (3) and averages only:

$$\bar{H} = 0.707 H \tag{6}$$

Since losses are proportional to the square of the magnetic field average:

$$L_2 = 0.5 L_3 \tag{7}$$

where $L_2$ and $L_3$, respectively, are the losses in the counter rotating and single cylinder embodiments. In FIGS. 1A and 1B conceptual nested rotating cylinders 5 and single rotating cylinder 5' are compared. In FIG. 1A, rotating cylinders 6 and 7 rotate about a coil cavity 8, with an indicated rotational direction 9. The small arrows show direction of magnetization and the large arrow shows the magnetic field's direction. FIG. 1A shows the relative positions of the rotating cylinders 6 and 7 aligned to produce the maximum strength. FIG. 1B depicts a single rotating cylinder 5' with a coil cavity 8' and a rotational direction 9'. Additionally, the counter-rotating nested cylinders of the present invention can also be configured to generate electrical beats by an unequal rotational speed for the two counter-rotating cylinders. Where the ratio of beat frequency to fundamental frequency is:

$$\frac{f_i - f_a}{f_r} \tag{8}$$

and the difference between the two rotational speeds $f_i$, $f_a$ is the beat frequency and $f_r$ is the average of $f_I$ and $f_a$.

The crucial idea behind all the counter-rotating nested cylinder structures of the present invention is that the magnetic materials are rigid i.e., they keep their magnetization in each other's presence and in the presence of the field they themselves generate. Therefore, the magnetic field that each component produces at any point can be added vectorially to those produced by the other components to obtain the total. If current is sent through the coils the cylinders can be made to rotate in opposite directions forming a motor.

The nested magic cylinders are rotatable and coaxially arranged so that the bore of the inner cylinder provides a central working space. The predetermined magnetic orientation of each cylinder's sections is arranged to create a relatively strong and uniform magnetic field within the central working space or bore in which copper wires are imbedded to form a core. A core having copper wires embedded within the working space is coaxially positioned within the bore to act as a rotor and when current flows within the copper wires an electric motor is therefore formed. Alternatively, a rotating device can mechanically rotate the rotor or core, inducing a current in the copper wires in the rotor or core thereby forming an electric generator. The sections of the nested permanent magnet cylinders are arranged such that each of the sections have a magnetic orientation forming a pair of coaxial "magic" cylinders or rings that counter rotate with respect to each other. This results in a relatively large magnetic field within the inner cylinder's central working space with minimal magnetic flux leakage exterior to the central working space. In a preferred embodiment the pair of magnetic cylinders counter rotate and the core remains stationary, which simplifies the required electrical connections with the core.

Accordingly, it is one object of the present invention to provide a compact efficient motor or generator that is relatively easily manufactured.

It is an advantage of the present invention that magnetic flux leakage due to eddy currents is substantially reduced or eliminated.

It is a feature of the present invention that a pair of rotatable nested permanent magnet cylinders, with each cylinder having a plurality of sections with different radial magnetic orientations is used, produces a relatively strong magnetic field within a central working space.

These and other objects, advantages, and features will become readily apparent in view of the following detailed description.

DETAILED DESCRIPTION OF THE PREFERRED EMBODIMENT

Figure 1A:
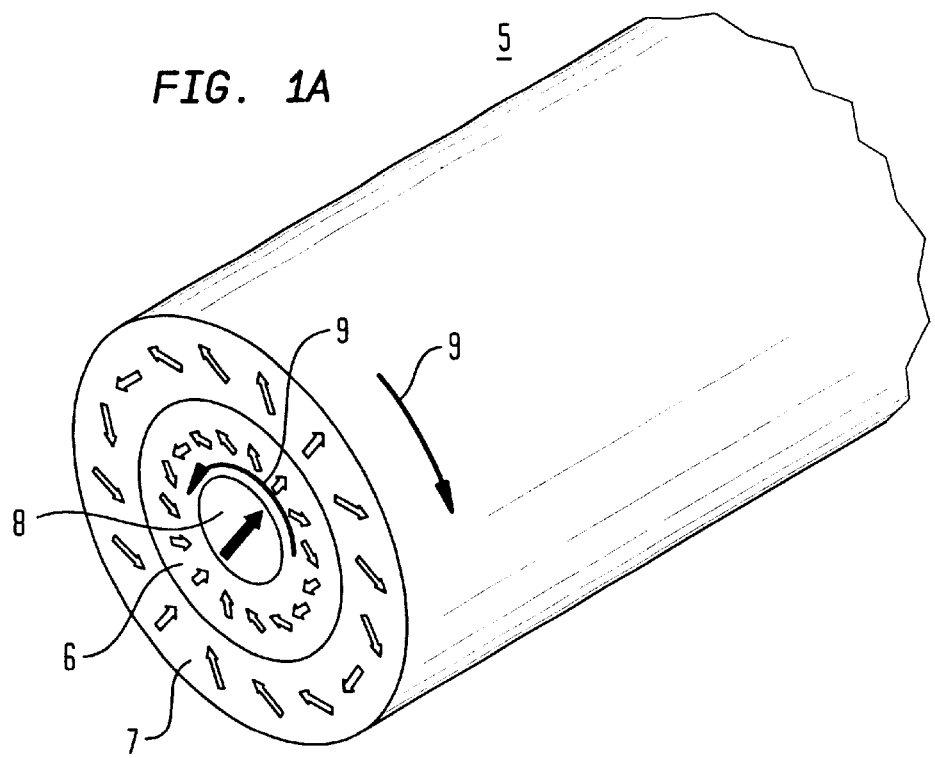
FIGS. 1A and 1B illustrate conceptual nested rotating cylinders and a single rotating cylinder.
Figure 1B:
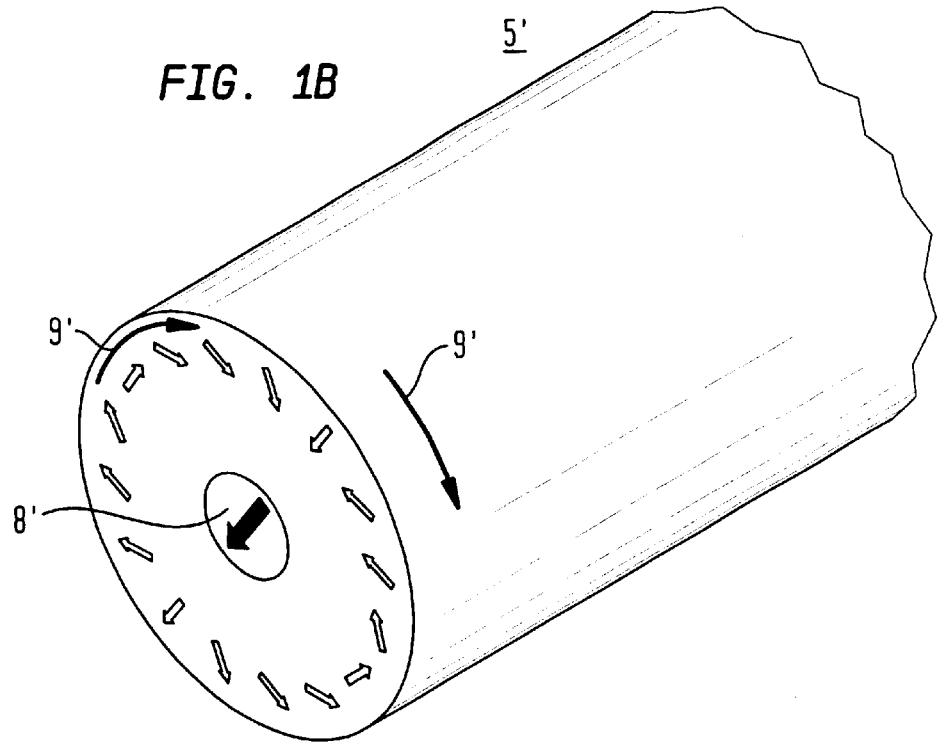
Figure 2:
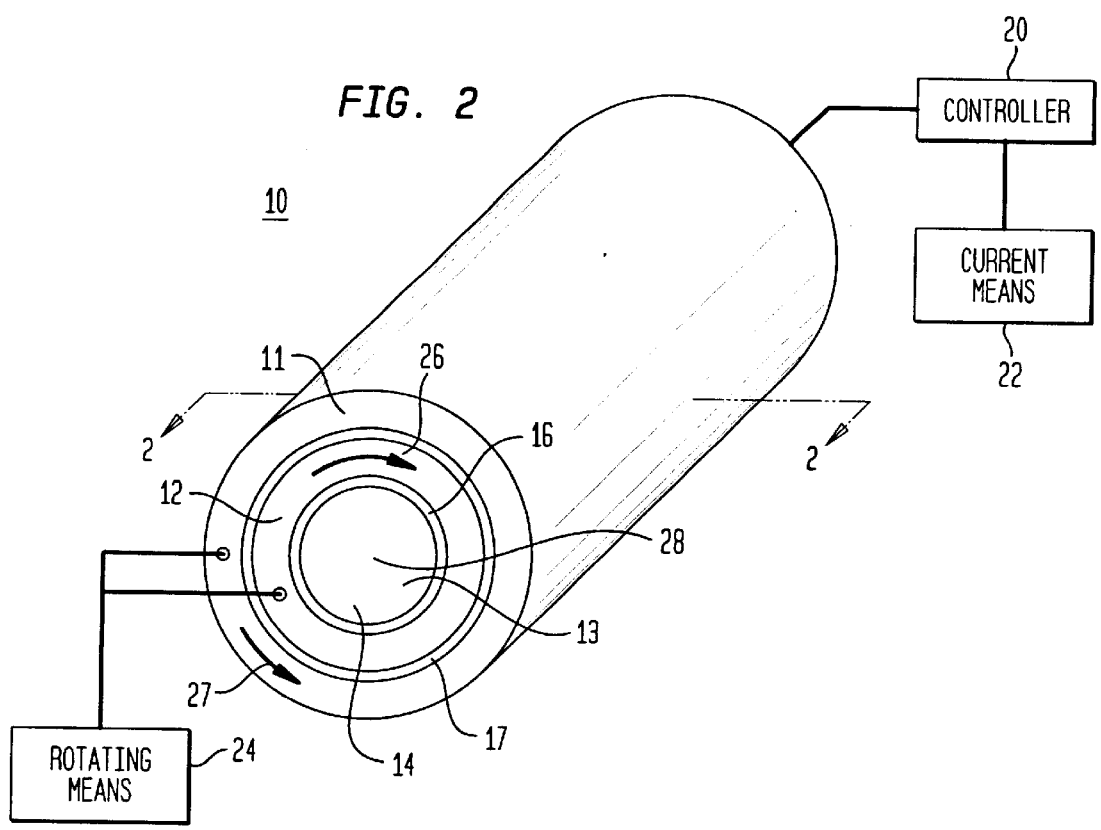
FIG. 2 schematically illustrates one embodiment of the present invention.

FIG. 2 schematically illustrates the present invention. An electric motor or generator 10 is illustrated. An outer permanent magnet cylinder 11 is composed of a first plurality of permanent sections, with different magnetization directions indicated by the small arrows. A second plurality of magnet sections forms an inner permanent magnet cylinder 12, which is coaxial with, and nested within, the outer cylinder 11. Both outer and inner permanent magnet cylinders 11 and 12, respectively, provide a magnetic flux flow, with the outer cylinder 11 providing a first magnetic field and the inner cylinder 12 providing a second magnetic field. The outer and inner permanent magnet cylinders 11 and 12, respectively, are rotatable with respect to each other. The inner permanent magnet cylinder 12 acts as a stator and together with outer permanent cylinder 11 forms a relatively strong central magnetic field within a coil cavity, or central working space 13, of the cylinder, which runs along the longitudinal axis of the outer cylinder 11.

A core 14 is coaxially placed within central working space 13 and acts as a rotor or armature. Between the core 14 and the inner permanent magnet cylinder 12, a gap 16 is formed. The gap 16 can be relatively small, and needs only to be sufficiently wide to permit the core 14 to turn. A cylinder gap 17 is formed between the outer permanent magnet cylinder 11 and the inner permanent magnet cylinder 12, which is dimensioned so that both outer and inner permanent magnet cylinders 11 and 12, respectively, can rotate freely with respect to each other. A means for providing a current 22 is coupled to a controller 20. The core or rotor 14 is coupled to a means for rotating 24.

In operation, inner permanent magnet cylinder 12 can rotate about a longitudinal axis 28 in the direction of arrow 26, while outer permanent magnet cylinder 11 rotates about longitudinal axis 28 in the direction of arrow 27, which is opposite in direction to arrow 26. Thus, the coaxial nested permanent magnet cylinders 11 and 12, respectively, counter rotate with respect to each other. The electric motor 10 illustrated in FIG. 2 can operate as an electric motor or a generator or dynamo. If a current source 22 provides a current to the windings in core 14, the induced magnetic field causes core 14 to rotate, resulting in an electric motor. If a rotating device 24 mechanically rotates core 14, a current is induced in the windings in core 14, resulting in an electric generator or dynamo.

Figure 3:
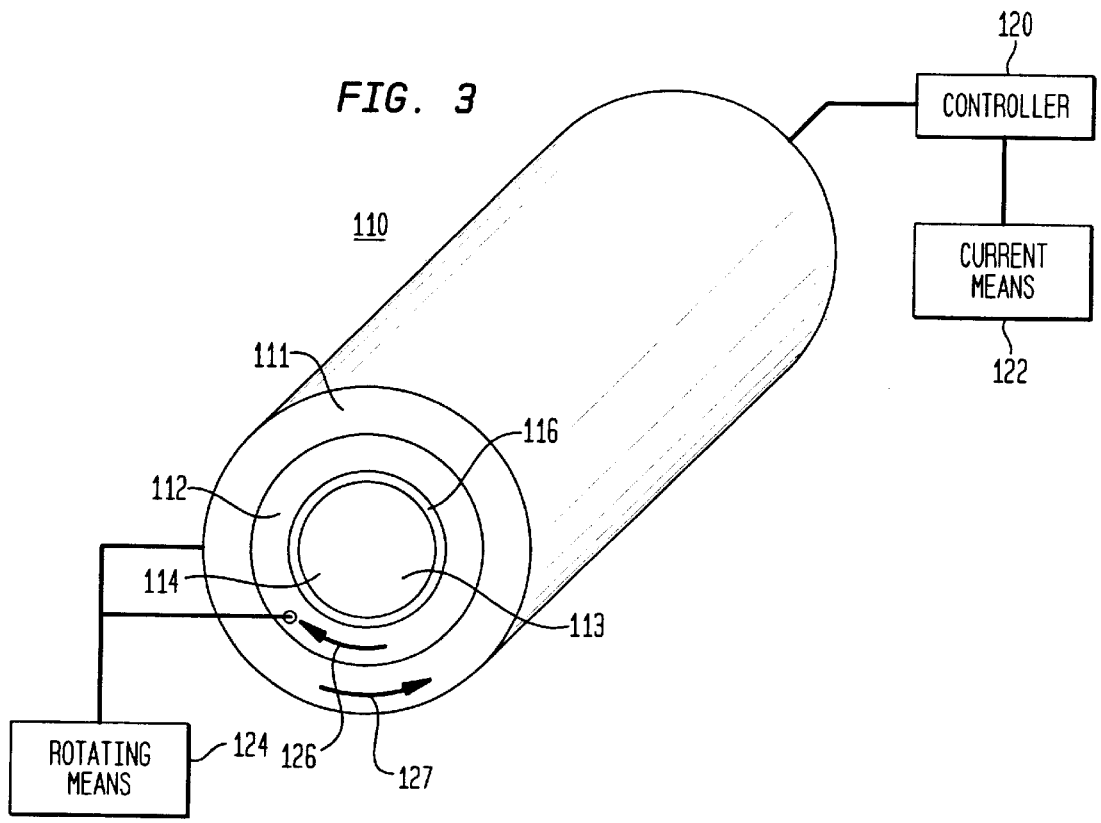
FIG. 3 schematically illustrates another embodiment of the present invention.

FIG. 3 illustrates a motor or generator 110. An outer permanent magnet cylinder 111 encases coaxial inner permanent magnet cylinder 112. Both outer and inner permanent magnet cylinders 111 and 112, respectively, provide magnetic flux rotatable with respect to each other, and are free to rotate around a stationary core 114. A gap 116 is formed between the inner permanent magnet cylinder 112 and the stationary core 114. The gap 116 need only be sufficiently wide to permit the permanent magnet cylinder 112 to rotate freely around the stationary core 114. A cylinder gap 117 is formed between the outer permanent magnet cylinder 111 and the inner permanent magnet cylinder 112, which is dimensioned so that both outer and inner permanent magnet cylinders 111 and 112, respectively, can rotate freely with respect to each other. A controller 120 is attached to the stationary core 114 and controls the flow of current from a means for providing a current 122. A means for rotating 124 may be attached to outer permanent magnet cylinder 111. Inner permanent magnet cylinder 112 is free to rotate about the stationary core 114 as indicated by the arrow 126. Outer permanent magnet cylinder 111 rotates about the inner permanent magnet cylinder 112 in the direction of arrow 127, which is opposite in direction to arrow 126. Thus, the coaxial nested permanent magnet cylinders 111 and 112, respectively, counter rotate with respect to each other and the stationary core 114. When the present invention is intended to function as a generator, mechanical work may be provided by the rotating means 124 to rotate the inner permanent magnet cylinder 112 inducing an electric current in core 114. When the present invention is intended to function as a motor, current from current means 122 may be provided to the stationary core 114 causing both inner and outer permanent magnet cylinders 111 and 112, respectively, to rotate turning the attached rotating means 124 to produce work.

Figure 4:
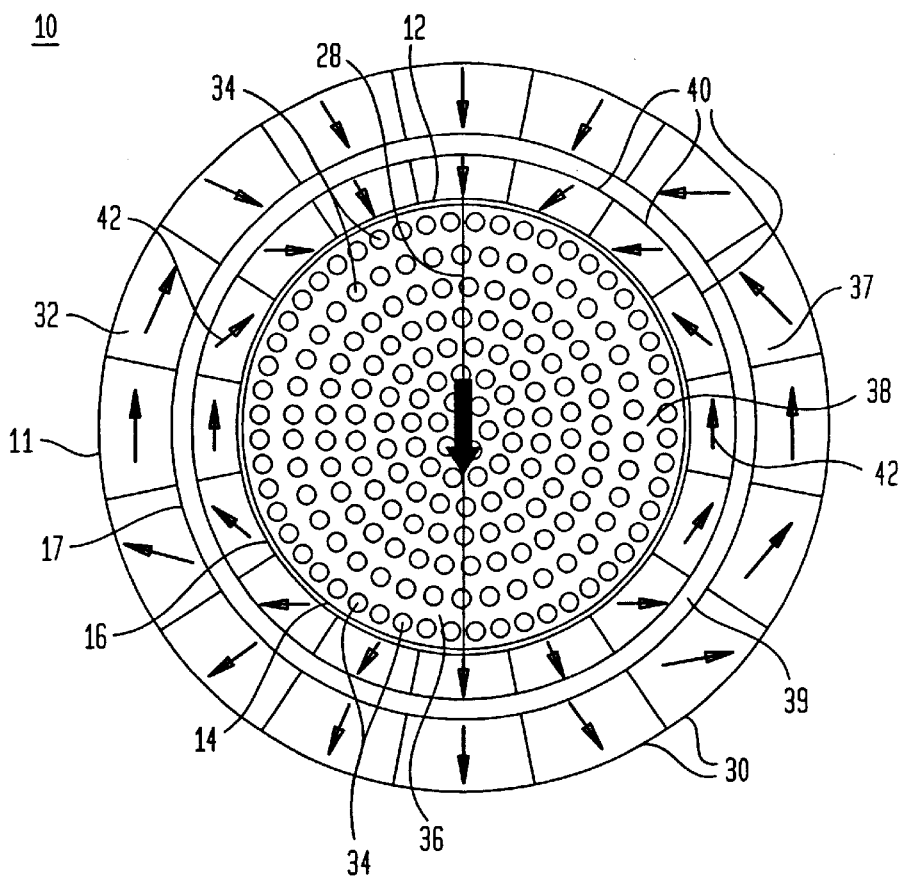
FIG. 4 is a cross section taken along line 2—2 in FIG. 2.

FIG. 4 is a cross section taken along line 2—2 in FIG. 2. FIG. 4 more clearly illustrates the outer permanent magnet cylinder 11 and inner permanent magnet cylinder 12 and the core 14 of the FIG. 2 embodiment in its start orientation at maximum field. In this drawing the size of core 14 is exaggerated for purposes of illustration. The outer permanent magnet cylinder 11 is comprised of a plurality of sections 30. Each of the plurality of sections has a magnetic orientation represented by thin arrows 32. The magnetic orientation represented by thin arrows 32 changes direction angularly while progressing around the central longitudinal axis 28. This arrangement of sections, having the predetermined magnetic orientation, is referred to as a "magic" ring or cylinder and provides a relatively large magnetic field within a central working space 14. Outer permanent magnet cylinder 11 is separated from inner permanent magnet cylinder 12 by cylinder gap 17. Similarly, the inner permanent magnet cylinder 12 is comprised of a plurality of sections 40. Each of the plurality of sections has a magnetic orientation represented by arrows 42. The magnetic orientation represented by thin arrows 42 changes direction angularly while progressing around the central longitudinal axis 28. The central longitudinal axis 28 divides the electrical current direction. For example, electrical current to the left of the central longitudinal axis 28 comes out of the paper and those to the right go into the paper.

Each of the permanent magnet cylinders 11 and 12, respectively, depicted in FIGS. 2 and 4 may be manufactured by known techniques. For example, by techniques disclosed in U.S. Pat. No. 5,337,472 entitled "Method Of Making Cylindrical And Spherical Permanent Magnet Structures" issuing to Leupold et al on Aug. 16, 1994, which is herein incorporated by reference. The inner permanent magnet cylinder 12 is separated from core 14 by the gap 16. Core 14 is made of a passive magnetic material 36 such as iron with copper wires 34 imbedded or riddled therein. The copper wires 34 form windings through which electric current travels. The copper wires 34 are divided into at least two sections so as to permit current to flow in different directions. Typically, the two sections will be semi-cylindrical with one section 37 on one side of an equator 38 and another section 39 on the other side of the equator 38. Each section 37 and 39 is coupled to a current means. The structure illustrated in FIG. 3 also applies generally to the embodiment illustrated in FIG. 2.

Figure 5:
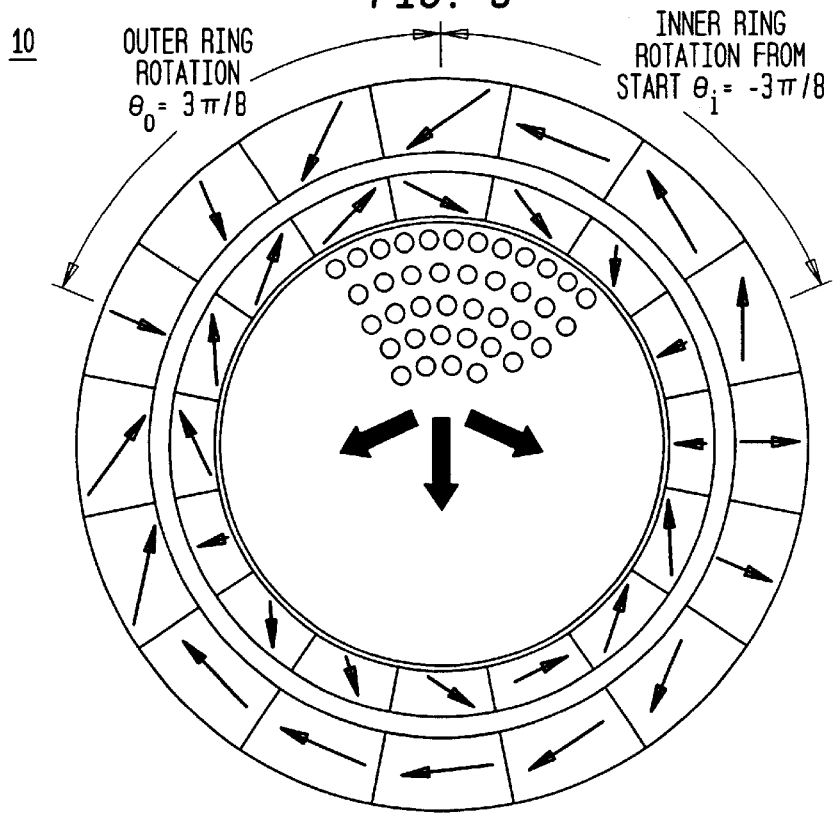
FIG. 5 is a frontal view of the rotation of the inner permanent magnet cylinder and outer permanent magnet cylinder of the coaxial nested permanent magnet cylinders.

FIG. 5 illustrates the rotation orientation of the outer permanent magnet cylinder and inner permanent magnet cylinder of the FIG. 2 embodiment of the coaxial nested permanent magnet cylinder 10 in a frontal view. In this drawing, most of the copper wires in the FIG. 4 central core have been removed to better illustrate the magnetic fields within the central core of the structure. In this drawing, the outer ring rotation is expressed by the formula:

$$\theta_o = 3\Pi/8$$

The inner ring rotation is expressed by the formula:

$$\theta_i = -3\Pi/8$$

In FIG. 5, the left thick arrow represents the inner ring $\vec{H}_i$ contribution to the total magnetic field, $\vec{H}$, and the right thick arrow represents the outer ring $\vec{H}_o$ contribution according to the following formula:

$$\vec{H}_i + \vec{H}_o = \vec{H}$$

Based on this formula, the total magnetic field H varies in length as the components $H_i$ and $H_o$ counter rotate.

Figure 6:
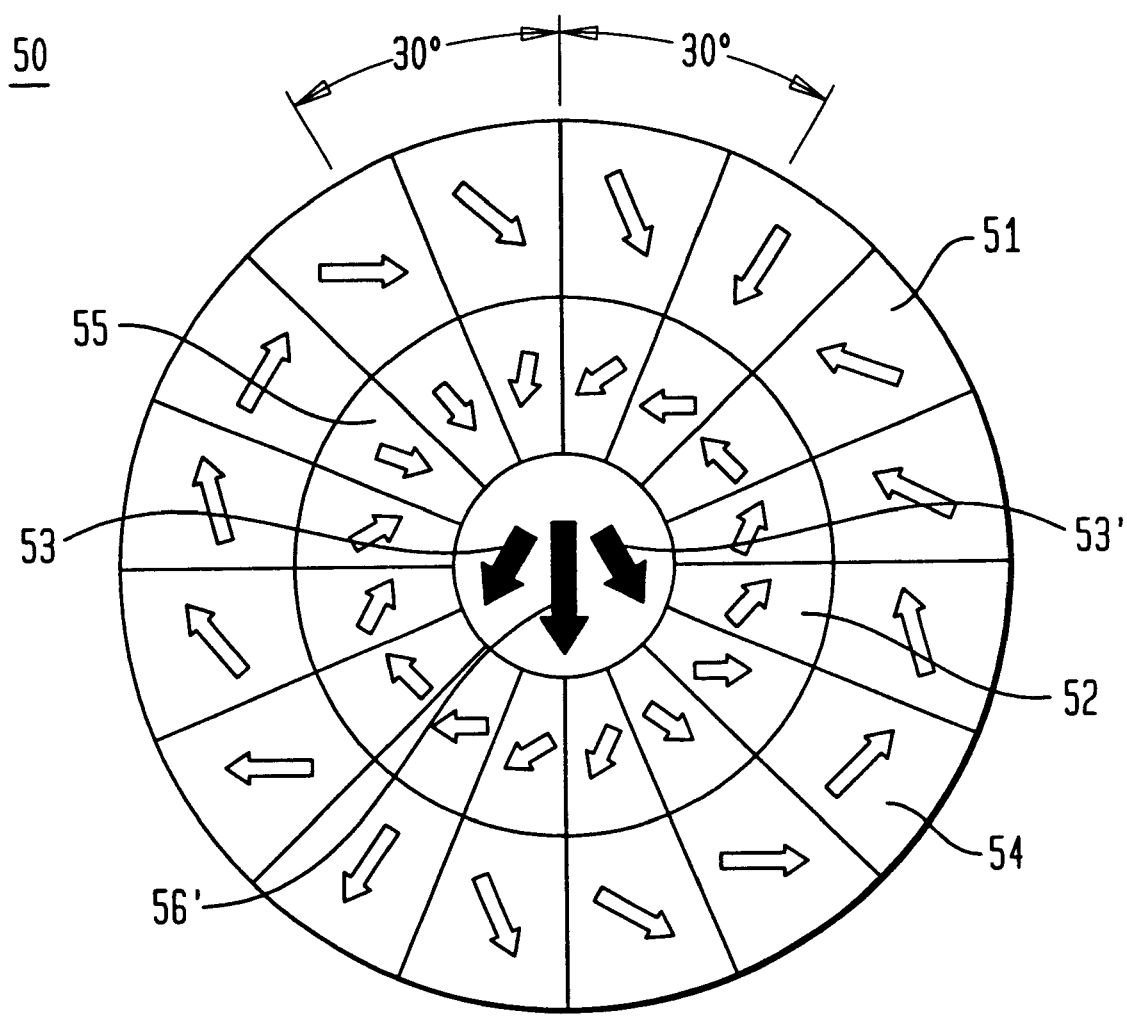
FIG. 6 illustrates the vector addition of magnetic fields of the coaxial nested permanent magnet cylinders.

FIG. 6 is a frontal view of the relatively simple coaxial counter rotating nested cylinder arrangement 50, with like numerals employed for the same structural elements, which illustrates vector addition of each cylinder's magnetic field with a relative rotation of the structure. In this figure, outer cylinder 51 and inner cylinder 52 are each rotated by 30°, which is a relative rotation of 60°. The relative strength of the magnetic flux in the central working space is now varied as indicated by thick arrows 53, 53' and 56'. Thick arrow 53 represents the field contribution from the outer cylinder 51. Thick arrow 53' represents the field contribution from the inner cylinder 52. Thick arrow 56' represents the total magnetic field based on the vector sum of 53 and 53'. The magnetic flux generated in the coaxial counter rotating nested cylinder 50 can be used to generate an AC current in conductors placed in the central working space. The generated currents are equivalent to those of a single prior art cylinder, but because the coaxial counter rotating nested cylinder 50 generates an internal field magnitude that is sinusoidal, instead of constant, lesser losses due to eddy currents are expected.

Figure 7:
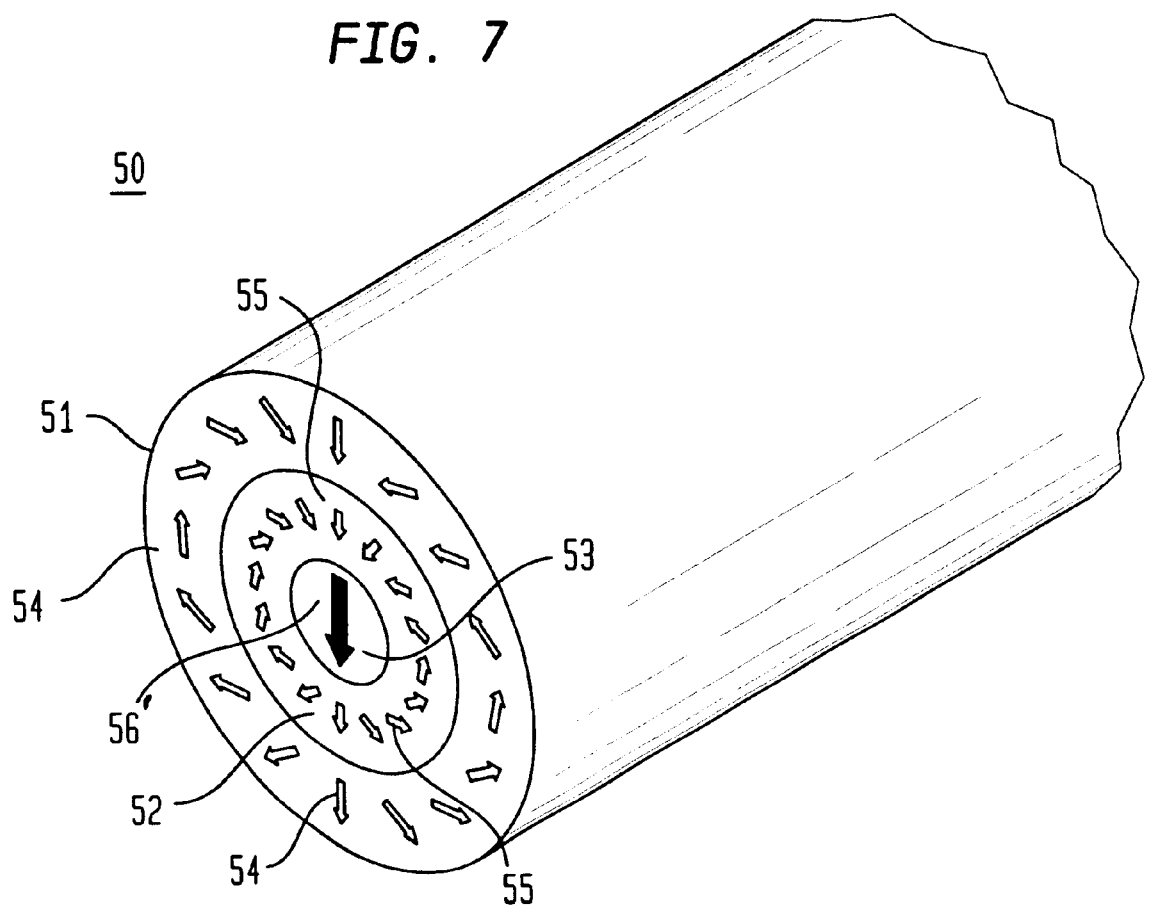
FIG. 7 illustrates the magnetic orientation of the coaxial nested permanent magnet cylinders in a perspective view.

FIG. 7 is a perspective view of the FIG. 6 structure 50 to better illustrate the operation of each cylinder's magnetic field, with like numerals employed for the same structural elements. Prior art adjustable magnetic field sources are described in H. A. Leupold "Rare-Earth Permanent Magnets," edited by J. M. D. Coey, Oxford Science Publications, Oxford University Press, Inc, New York, N.Y., pp. 381–429 and H. A. Leupold et al., Journal of Applied Physics, 64, p. 5994, 1988. The coaxial counter rotating nested cylinder structure 50 comprises an outer cylinder 51 and an inner cylinder 52. The inner cylinder 52 defines a central working space 53. This structure 50 produces equal field strengths in central working space 53. Small arrows 54 indicate the magnetization direction of outer cylinder 51 and small arrows 55 indicate the magnetization direction of inner cylinder 52. Thick arrow 56' shows the central magnetic field.

For each cylinder's field strength to be equal, the outer radius of inner cylinder 52, $R_1$, must be the geometric mean between the central working space 53 radius, $R_2$, and the outer radius of the outer cylinder 51, $R_3$. Outer cylinder 51 has a first polar plane and inner cylinder 52 has a second polar plane. If these cylinders are rotated with respect to each other, their magnetic fields add vectorially with the resultant magnetic flux in magnetic field 56 varying sinusoidally with half the angle between each cylinder's polar planes.

Additionally, while several embodiments have been illustrated and described, it will be obvious to those skilled in the art that various modifications may be made without departing from the spirit and scope of this invention.

What is claimed is:

1. A counter rotating nested cylindrical permanent magnet electric device, comprising:
   an outer cylinder, having a bore along a longitudinal axis and a first magnetic orientation, provides a first magnetic field;
   an inner cylinder is nested coaxially within said outer cylinder;
   said inner cylinder, having a coil cavity along said longitudinal axis and a second magnetic orientation, provides a second magnetic field;

a core made of a passive magnetic material is disposed within said coil cavity is free to rotate within said coil cavity relative to said inner cylinder;

said outer cylinder rotates in a first direction and said inner cylinder counter rotates about said longitudinal axis in an opposite direction from said first direction, said inner cylinder being separated from said outer cylinder by a cylinder border, said cylinder border having a radius, $r_b$, which is calculated according to the following formula:

$$r_b = \sqrt{r_i} r_o$$

where said $r_i$ is the radius of the core cavity and said $r_o$ is the outer radius of said outer cylinder;

a plurality of copper wires longitudinally disposed in said core forming windings;

a current means coupled to a controller;

said outer cylinder rotates about said longitudinal axis and said inner cylinder counter rotates producing a magnetic flux in a central magnetic field in said coil cavity;

said central magnetic field having equal field strengths from said outer cylinder and said inner cylinder;

an electric current traveling within said plurality of copper wires creates an induced field to interact with said central magnetic field;

said inner cylinder counter rotating with respect to said outer cylinder causes said first magnetic field to add vectorially to said second magnetic field;

said inner cylinder counter rotating with respect to said outer cylinder at the same angular speed causes said magnetic flux to vary sinusoidally according to the formula:

$$\Phi = A(H \sin \omega t)$$

where said $\Phi$ is said central magnetic field, said A is a coil area, said H sin is a varying amplitude and said $\omega t$ is rate of turning, to minimize an exterior leakage of said magnetic flux due to Eddy current loss, resulting in a reduced temperature for said coil cavity and an augmented central magnetic field.

2. The counter rotating nested cylindrical permanent magnet electric device, as recited in claim 1, further comprising said core being separated from said inner cylinder by a gap.

3. The counter rotating nested cylindrical permanent magnet electric device, as recited in claim 2, further comprising said inner cylinder being separated from said outer cylinder by a cylinder gap.

4. The counter rotating nested cylindrical permanent magnet electric device, as recited in claim 3, further comprising said outer cylinder being formed from a plurality of permanent magnetic sections.

5. The counter rotating nested cylindrical permanent magnet electric device, as recited in claim 4, further comprising said inner cylinder being formed from a plurality of permanent magnetic sections.

6. The counter rotating nested cylindrical permanent magnet electric device, as recited in claim 5, further comprising said outer cylinder having a first polar plane.

7. The counter rotating nested cylindrical permanent magnet electric device, as recited in claim 6, further comprising said inner cylinder having a second polar plane.

8. The counter rotating nested cylindrical permanent magnet electric device, as recited in claim 7, further comprising said central magnetic field varying sinusoidally with half the angle between said first polar plane and said second polar plane.

9. A counter rotating nested cylindrical permanent magnet electric device, comprising:

a first plurality of permanent magnet sections arranged in an outer cylinder having a bore along a longitudinal axis, each of said plurality of permanent magnet sections having a first magnetic orientation and having a first magnetic field;

a second plurality of permanent magnet sections arranged in an inner cylinder, said inner cylinder having a coil cavity along said longitudinal axis, each of said second plurality of permanent magnet sections having a second magnetic orientation and forming a second magnetic field;

said inner cylinder is nested coaxially within said outer cylinder;

a core made of a passive magnetic material is disposed within said coil cavity, said core being separated from said inner cylinder by a gap, being free to rotate within said coil cavity relative to said inner cylinder;

said inner cylinder being separated from said outer cylinder by a cylinder border, said cylinder border having a radius, $r_b$, which is calculated according to the following formula:

$$r_b = \sqrt{r_i} r_o$$

where said $r_i$ is the radius of the core cavity and said $r_o$ is the outer radius of said outer cylinder;

said outer cylinder and said inner cylinder being freely rotatable with respect to each other;

a plurality of copper wires longitudinally disposed in said core forming windings;

a commutator coupled to said plurality of copper wires;

a controller coupled to said commutator;

a current means coupled to said controller;

said outer cylinder rotates about said longitudinal axis in a first direction and said inner cylinder counter rotates about said longitudinal axis producing a magnetic flux in a central magnetic field in said coil cavity;

said central magnetic field having equal field strengths from said outer cylinder and said inner cylinder;

an electric current traveling within said plurality of copper wires creates an induced field to interact with said central magnetic field;

said inner cylinder counter rotating with respect to said outer cylinder causes said first magnetic field to add vectorially to said second magnetic field;

said inner cylinder counter rotating with respect to said outer cylinder at the same angular speed causes said magnetic flux to vary sinusoidally according to the formula:

$$\Phi = A(H \sin \omega t)$$

where said $\Phi$ is said central magnetic field, said A is a coil area, said H sin is a varying amplitude and said $\omega t$ is a rate of turning, to minimize an exterior leakage of said magnetic flux due to Eddy current loss, resulting in a reduced temperature for said coil cavity and an augmented central magnetic field.

10. The counter rotating nested cylindrical permanent magnet electric device, as recited in claim 9, further comprising said outer cylinder having a first polar plane.

11. The counter rotating nested cylindrical permanent magnet electric device, as recited in claim 10, further comprising said inner cylinder having a second polar plane.

12. The counter rotating nested cylindrical permanent magnet electric device, as recited in claim 11, further comprising:

said inner cylinder counter rotating with respect to said outer cylinder causes said first magnetic field to add vectorially to said second magnetic field; and said magnetic flux in said central magnetic field varies sinusoidally.

13. The counter rotating nested cylindrical permanent magnet electric device, as recited in claim 12, further comprising said central magnetic field varying sinusoidally with half the angle between said first polar plane and said second polar plane.

* * * * *